United States Patent
Yang

(10) Patent No.: US 9,127,851 B2
(45) Date of Patent: Sep. 8, 2015

(54) HEATING AND COOLING SYSTEM INCLUDING A HEAT PUMP AND A HEAT STORAGE TANK

(76) Inventor: Yixin Yang, Rockville, MD (US)

( * ) Notice: Subject to any disclaimer, the term of this patent is extended or adjusted under 35 U.S.C. 154(b) by 623 days.

(21) Appl. No.: 13/536,231

(22) Filed: Jun. 28, 2012

(65) Prior Publication Data

US 2014/0000840 A1 Jan. 2, 2014

(51) Int. Cl.
*F25B 13/00* (2006.01)
*F24F 5/00* (2006.01)
*F25B 29/00* (2006.01)

(52) U.S. Cl.
CPC ............. *F24F 5/0017* (2013.01); *F24F 5/001* (2013.01); *F24F 2005/0025* (2013.01); *F25B 29/003* (2013.01); *Y02E 60/147* (2013.01)

(58) Field of Classification Search
CPC .......... F25B 30/00; F25B 30/02; F25B 30/04; F25B 30/06; F25B 29/00; F25B 29/003; F25B 29/006
USPC .......................................................... 165/62
See application file for complete search history.

(56) References Cited

U.S. PATENT DOCUMENTS

| | | | | |
|---|---|---|---|---|
| 2,693,939 A * | 11/1954 | Marchant et al. | ............... | 165/49 |
| 3,670,806 A * | 6/1972 | McFarlan | ......................... | 165/63 |
| 3,853,172 A * | 12/1974 | McFarlan | ......................... | 165/62 |
| 4,030,312 A * | 6/1977 | Wallin et al. | ................. | 62/235.1 |
| 4,055,965 A * | 11/1977 | Girard | ............................ | 62/324.3 |
| 4,065,938 A * | 1/1978 | Jonsson | ........................... | 62/160 |
| 4,100,763 A * | 7/1978 | Brody | ............................ | 62/238.6 |
| 4,165,037 A * | 8/1979 | McCarson | .................... | 62/238.6 |
| 4,269,263 A * | 5/1981 | Yukimachi et al. | ............. | 165/62 |
| 4,299,277 A * | 11/1981 | McGregor | .................... | 165/48.2 |
| 4,488,408 A * | 12/1984 | Kajitsuka | ...................... | 62/235.1 |
| 4,523,631 A * | 6/1985 | McKinney | .................... | 62/238.3 |
| 4,940,079 A * | 7/1990 | Best et al. | ....................... | 165/236 |
| 5,218,844 A * | 6/1993 | Nishiguchi et al. | ........... | 62/238.3 |
| 5,291,941 A * | 3/1994 | Enomoto et al. | ................ | 165/62 |
| 5,355,688 A * | 10/1994 | Rafalovich et al. | ............. | 62/117 |
| 5,361,601 A * | 11/1994 | Han et al. | ......................... | 165/62 |
| 5,442,931 A * | 8/1995 | Ryan et al. | ..................... | 62/324.2 |
| 5,497,629 A * | 3/1996 | Rafalovich et al. | ............... | 62/98 |
| 5,507,337 A * | 4/1996 | Rafalovich et al. | ............. | 165/63 |
| 5,730,216 A * | 3/1998 | Viegas et al. | .................... | 165/61 |
| 5,737,930 A * | 4/1998 | Karl | .............................. | 62/324.4 |
| 6,109,046 A * | 8/2000 | Karl | .............................. | 62/324.4 |
| 6,178,761 B1 * | 1/2001 | Karl | .............................. | 62/159 |
| 6,192,695 B1 * | 2/2001 | Hirota | .......................... | 62/196.4 |
| 6,202,430 B1 * | 3/2001 | Karl | .............................. | 62/184 |
| 6,351,959 B1 * | 3/2002 | Hirota | .............................. | 62/198 |
| 6,536,677 B2 * | 3/2003 | Melendez-Gonzalez et al. | ............................................ | 62/324.4 |
| 6,729,157 B2 * | 5/2004 | Oshitani et al. | ............... | 62/324.2 |
| 6,834,714 B2 * | 12/2004 | Walsh | ....................... | 237/12.3 B |
| 7,004,246 B2 * | 2/2006 | Gavula | .......................... | 62/324.5 |
| 7,290,600 B2 * | 11/2007 | Gavula | ........................... | 165/62 |
| 7,536,869 B2 * | 5/2009 | Inaba et al. | ..................... | 62/238.6 |
| 8,082,744 B2 * | 12/2011 | Hwang et al. | .................... | 62/150 |
| 8,146,375 B2 * | 4/2012 | Mohs et al. | ...................... | 62/113 |
| 8,640,475 B2 * | 2/2014 | Park et al. | ..................... | 62/238.7 |

(Continued)

*Primary Examiner* — Ljiljana Ciric
(74) *Attorney, Agent, or Firm* — Ming Chow; Sinorica, LLC

(57) ABSTRACT

A heating and cooling system including a heat pump and a heat storage tank. Stored heat or cold is released from the heat storage tank for heating or cooling a house for a whole day. The heating and cooling system has five working modes: compressor heating or cooling, compressor charging, compressor discharging for heating or cooling, water pump charging and water pump discharging for heating or cooling.

8 Claims, 12 Drawing Sheets

(56) References Cited

U.S. PATENT DOCUMENTS

| | | | |
|---|---|---|---|
| 8,650,897 B2* | 2/2014 | Honda | 62/324.1 |
| 8,657,207 B2* | 2/2014 | Back et al. | 62/259.1 |
| 8,756,943 B2* | 6/2014 | Chen et al. | 62/324.4 |
| 8,794,538 B2* | 8/2014 | Park et al. | 237/2 B |
| 8,800,313 B2* | 8/2014 | Woo et al. | 62/336 |
| 8,850,837 B2* | 10/2014 | Park et al. | 62/160 |
| 2004/0000399 A1* | 1/2004 | Gavula | 165/62 |
| 2010/0024449 A1* | 2/2010 | Hwang et al. | 62/113 |
| 2010/0025488 A1* | 2/2010 | Park et al. | 62/259.1 |
| 2010/0051713 A1* | 3/2010 | Back et al. | 62/259.1 |
| 2011/0259024 A1* | 10/2011 | Park et al. | 62/238.6 |
| 2011/0302949 A1* | 12/2011 | Honda | 62/324.6 |
| 2012/0042678 A1* | 2/2012 | Park et al. | 62/324.1 |
| 2012/0198874 A1* | 8/2012 | Yamashita et al. | 165/62 |
| 2012/0227926 A1* | 9/2012 | Field et al. | 165/10 |
| 2012/0279681 A1* | 11/2012 | Vaughan et al. | 165/62 |
| 2012/0285188 A1* | 11/2012 | Honda | 62/238.1 |
| 2013/0160985 A1* | 6/2013 | Chen et al. | 165/201 |
| 2014/0245770 A1* | 9/2014 | Chen et al. | 62/238.7 |

* cited by examiner

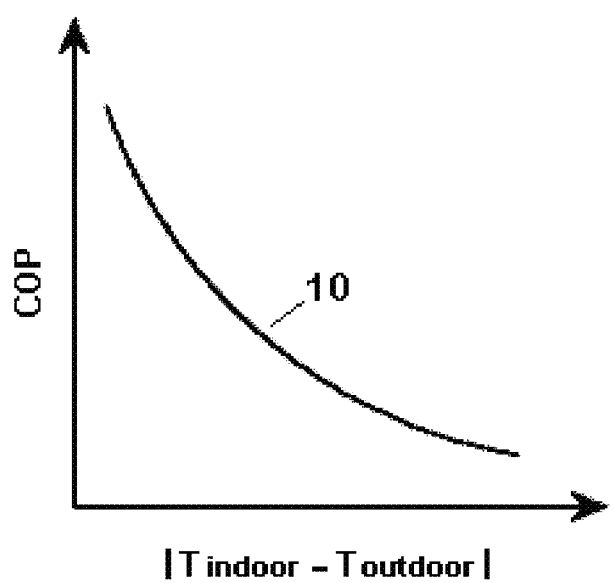
Figure 1 The curve of COP versus the temperature Difference between indoor and outdoor coils

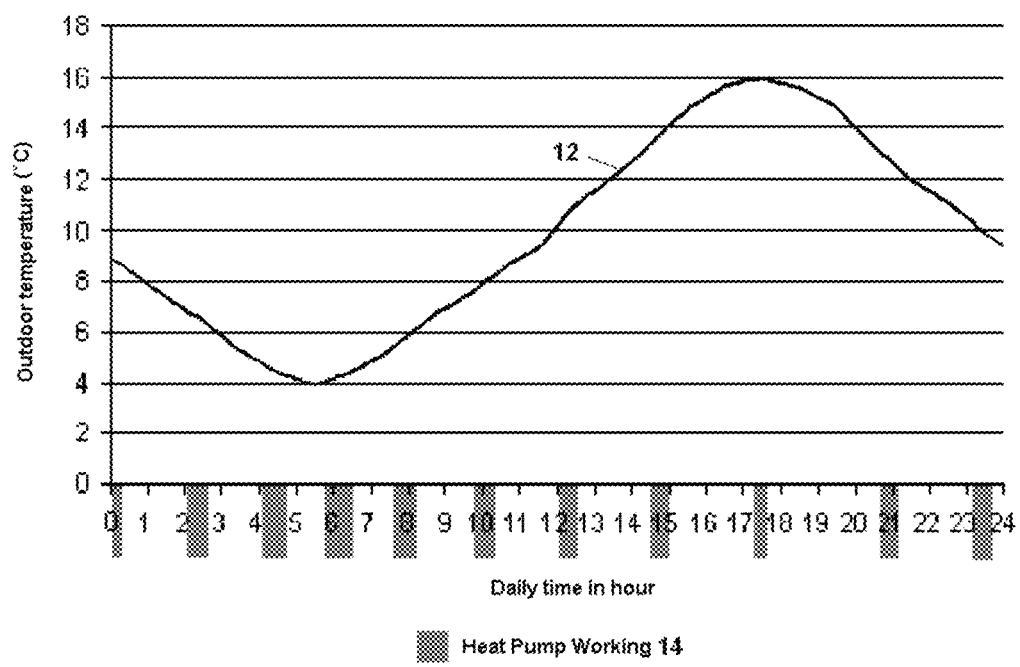
Figure 2A Daily outdoor temperature curve and heat pump working status

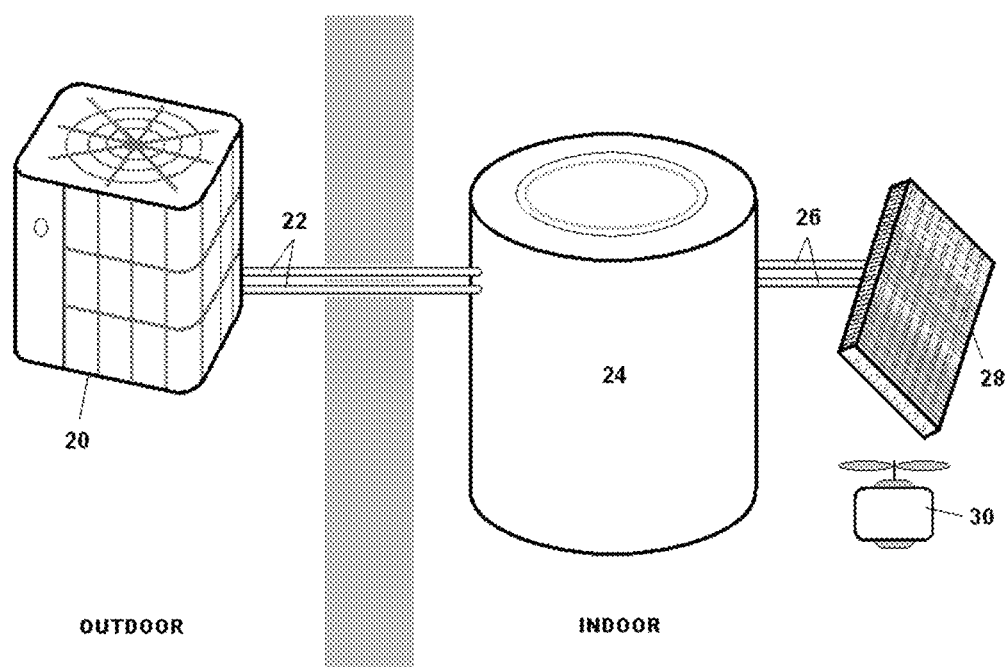
Figure 3 The daily heat storage tank is incorporated into an air source heat pump system

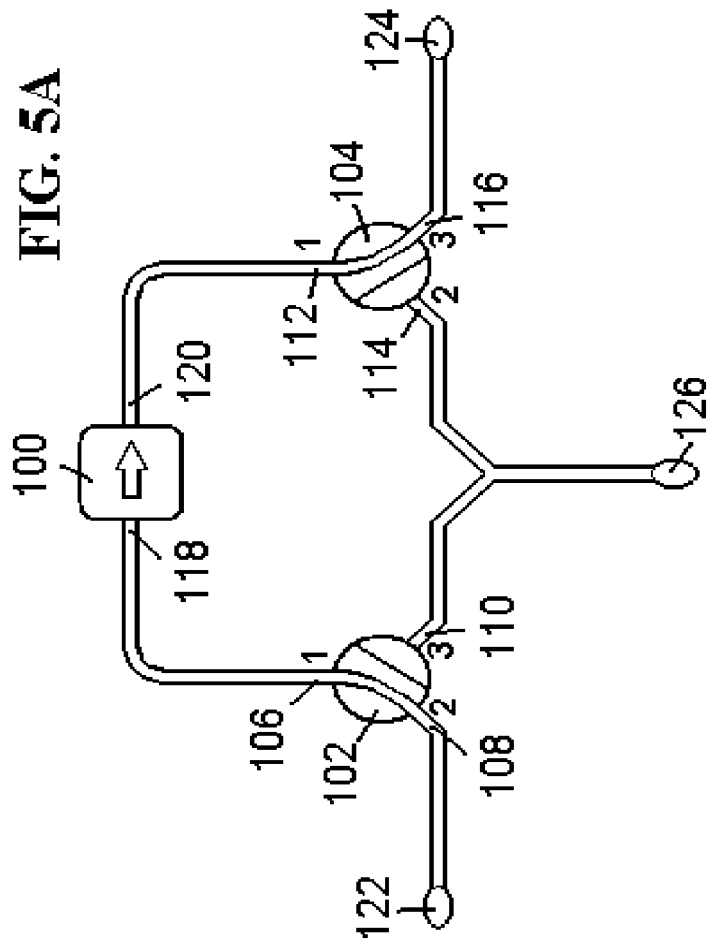

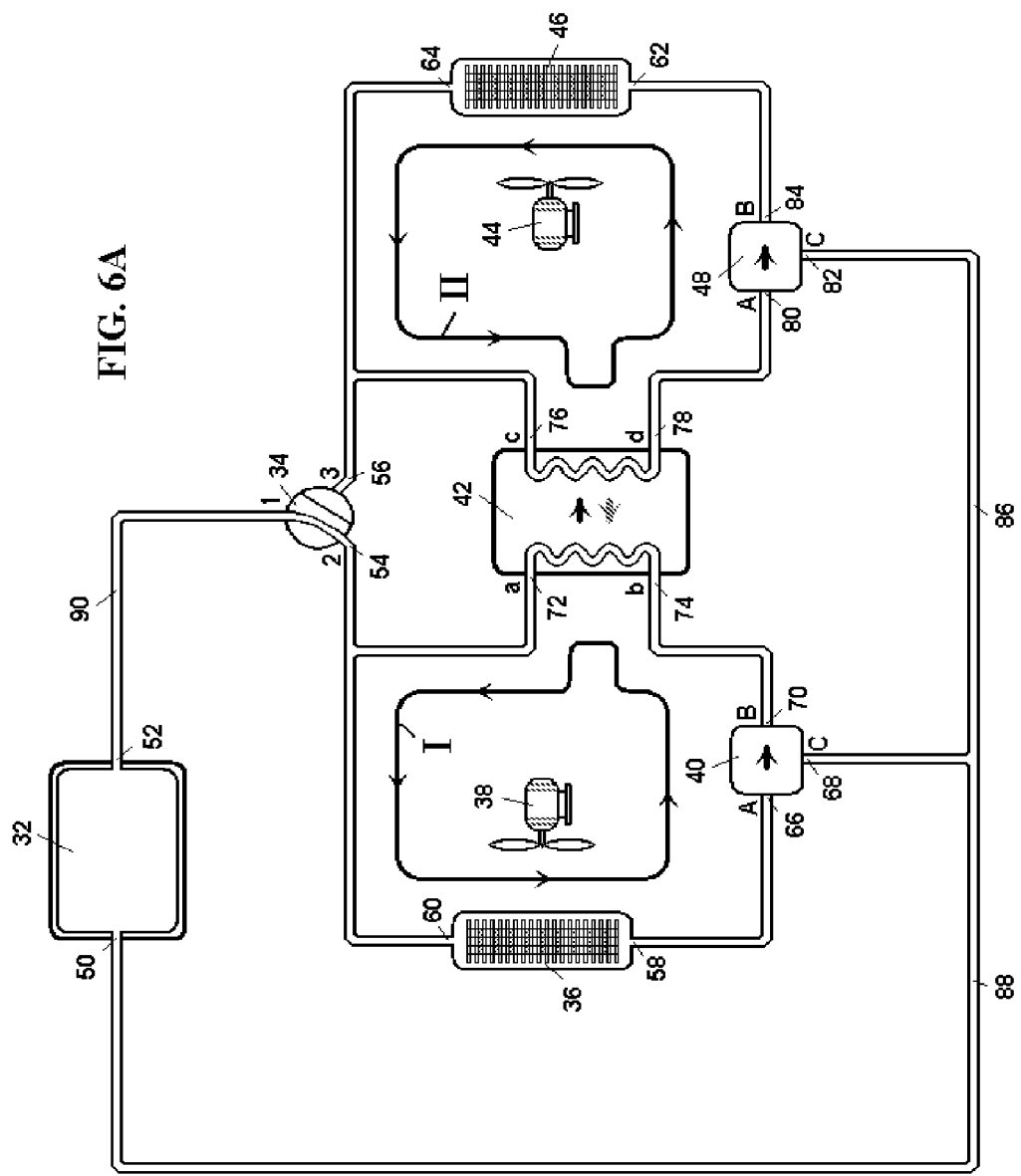

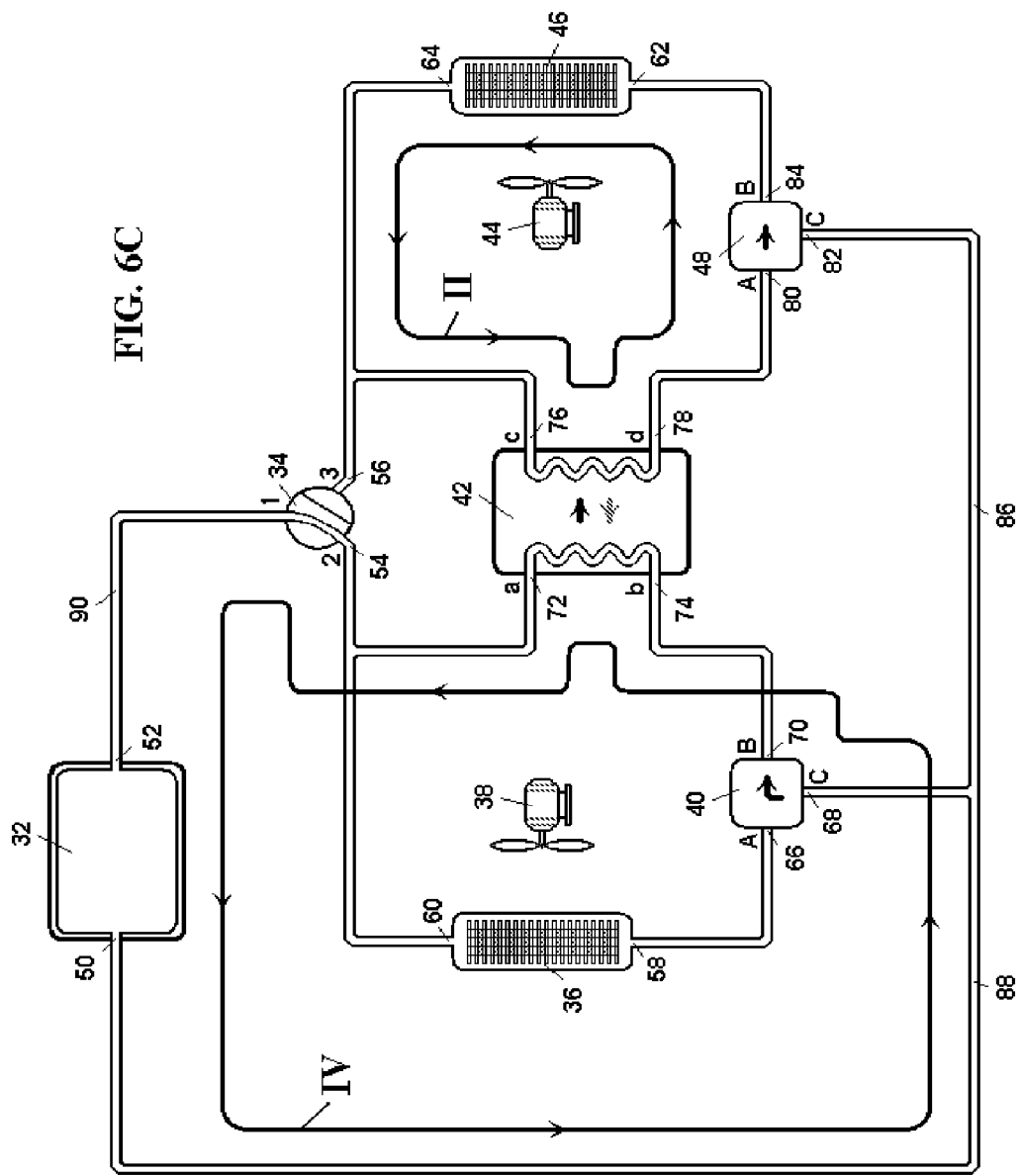

HEATING AND COOLING SYSTEM INCLUDING A HEAT PUMP AND A HEAT STORAGE TANK

FIELD OF THE INVENTION

The invention relates generally to a heat storage tank for incorporating with a heat pump or an air conditioning systems.

BACKGROUND OF THE INVENTION

Solar heat is a type of free and renewable energy for heating houses in spring, fall and winter seasons, and providing hot water in summer. Solar heat/energy is used to be collected by a large size collector, from which the collected heat is transfer into a house by blowing air for heating it, or stored in a water tank for providing hot water. Actually, this is a direct way to collect solar energy, and it has many weaknesses. First, the solar heat with direct collection cannot be a stable heat source. It can only be collected on sunny days, no heat comes out on those cloudy days. Second, the direct solar heat is only for heating rather than cooling a house. Third, solar heat collecting systems have a large size/area collector with some pipe, fan or tank, which cost and installing fee are not inexpensive. Also, the systems for heating house and providing hot water are used to be designed as different systems, which cannot share the collector.

In fact, there is an indirect way to collect solar heat and it is much more stable for both heating and/or cooling a house in spring, summer, fall and winter in mild/hot climate regions. It is well known that the outdoor air has a temperature difference between daytime and nighttime due to the sun heats up the atmosphere and surface of earth in daytime and the stored heat dissipates into space in the nighttime. The daily temperature difference can be from 5° C. to 15° C. in all seasons and most geographical locations. Usually, a daily high temperature peak occurs between 2:00 pm and 7:00 pm, while a daily low temperature peak takes place between 3:00 am and 8:00 am.

Heat pumps are used in applications of space heating or cooling for human comfort in offices and residential homes. Heat pumps are able to move heat energy between one environment and another. When a heat pump is installed in a house, it can bring heat into (heating) or take heat out of (cooling) the house.

In heating mode of a heat pump for example, unlike an electric or gas heater, a heat pump moves heat from an outdoor space into an indoor space rather than creating it. Coefficient of Performance (COP) is used to present how efficient a heat pump works. COP is defined as the ratio of useful heat output to electricity energy input. Heating a house on a mild day at 10° C., a typical air source heat pump has a COP of 3 to 4, while an electric heater with pure resistance has the COP of 1. COP is also applied in cooling mode. The theoretical COP for a heat pump for both heating and cooling modes can be expressed as:

$$COP_{heating} = \frac{\Delta Q_{hot}}{\Delta A} = \frac{T_{indoor}}{T_{indoor} - T_{outdoor}} \quad (1)$$

$$COP_{cooling} = \frac{\Delta Q_{cool}}{\Delta A} = \frac{T_{indoor}}{T_{outdoor} - T_{indoor}} \quad (2)$$

Where $\Delta Q_{hot}$ is the amount of heat moved from outdoor coil to indoor coil, $\Delta Q_{cool}$ is the amount of heat moved from indoor coil to outdoor coil. $\Delta A$ is the electrical energy taken by compressor and fans. $T_{indoor}$ and $T_{outdoor}$ are the temperatures of the indoor and outdoor coils in degree Kelvin (K).

COP of a heat pump is various when the difference of outdoor temperature and indoor temperature changes. FIG. 1 gives a roughly curve 10 of COP versus the absolute value of temperature difference between indoor and outdoor coils $|T_{indoor}-T_{outdoor}|$, which is applied for both heating and cooling. When the difference between indoor and outdoor temperatures is higher, the heat pump needs to run more cycles for moving the same amount of heat, and COP is lower. When the difference between indoor and outdoor temperatures is lower, the same amount of heat can be moved less cycles, COP becomes higher.

According to the COP characteristics, an air source heat pump can be used to collect solar heat indirectly for both heating and cooling by using the daily temperature difference. For heating a house in spring, fall or winter, a heat pump should work as much as possible in the daily highest temperature time when the daily COP is the largest value. For cooling the house in summer, the heat pump should work much in the lowest daily temperature time for the best daily COP. In this way, the COP of the heat pump always works with the best daily COP for both heating and cooling.

Unfortunately, current air source heat pumps always work harder with the worst daily COP. FIG. 2A illustrates the outdoor temperature curve on a mild day and a heat pump working status in heating mode. The curve 12 expresses the daily temperature change, and boxes 14 on the time dimension show the heat pump working status with each starting and working time. At the low temperature peak happens around 6:00 am, the heat pump starts more frequently and works longer in each working time when the house loses more heat and heat pump works in its worst working condition with lowest daily COP. At the high temperature peak around 6:00 pm, the heat pump starts less than the average rate and works shorter in each working time when the house loses less heat and heat pump works in its best working condition.

In FIG. 2A, the average temperature of the best three hours is 15.5° C. from time 16:00 pm to 19:00 pm, then the average best $COP_{ideal}=(273.15+35)/(35-15.5)=15.8$, where $T_{indoor}$ and $T_{outdoor}$ are assumed as 35° C. (an indoor coil temperature under the blowing of an indoor fan) and 15.5° C. respectively. The average COP in the rest time can be calculated as 11.2 by using the method of differential equation. If the heat pump can work for three hours in high temperature duration to deliver heat for heating the house in the whole day, the theoretical COP can be increased for 15.8−11.3=4.6, then the increase rate is 4.6÷11.2=41%, which can be treated as the improvement in practical COP.

Due to the house needs the least heat in the duration of highest daily COP of a heat pump, a heat storage tank is the only condition to make a heat pump works in this duration. Thus, the heat pump can work with its best daily COP to store the heat into the tank for a whole day using, and the stored heat will be released from the tank into house in the rest time of the day.

FIG. 2B illustrates this type of time shifting mode. In FIG. 2B, the box 14 indicates the heat pump working for heating the house, the boxes 16 mean that the heat pump working for charging the heat into the heat pump and the boxes 18 express the heat stored tank discharging for heating the house. In the low temperature duration, the heat pump doesn't work, the house is heated by stored heat in the tank. In the high temperature duration, the heat pump works for two or more hours to heat the house and/or charge heat into the tank.

Such the system can be implemented by incorporating a heat storage tank into a heat pump system as shown in FIG. 3. Based on a typical air source heat pump system, a daily heat storage tank 24 is applied between the outdoor unit 20 of the heat pump and its indoor coil 28. The refrigerant tubes 22 connects the daily heat storage tank 24 and outdoor unit 20, while the water tubes 26 connects the daily heat storage tank 24 and the indoor coil 28. A fan/blower 30 is in charge of exchanging heat between the indoor coil 28 and indoor air. The heat storage tank 24 can be charged or discharged by either heat or cool, so the stored heat or cool can be a source to heat the house in spring, fall and winter or to cool the house in summer Some heat exchanger and water pump can be used to make this system works much efficient than a normal heat pump, but when the heat storage tank is used to store a certain amount heat for a whole day using, its feasibility does need to be discussed. Usually, water is a very good material to store heat or cool for countless times charging and discharging.

In a mild climate area, 80,000~120,000 BTU daily heat is an essential amount for heating a house in spring, fall and winter. If water is used for storing 150,000 BTU heat to cover the worst case usage, and assume that the water tank is charged and discharged by heat between 30~45° C., that means 15° C. or 27° F. temperature difference, then the amount of water can be calculated as 150,000 BTU/27° F.=5556 lbs or 666 gallons, since the daily heat storage tank is installed in an indoor space, such the amount of water makes the tank very big. In cooling operation, the same amount of water can be charged or discharged by cool between 5~20° C., which is also 15° C. or 27° F. temperature difference, then the same amount of cool is used for cooling the house for one day. It is obvious that the system in FIG. 3 has a big size tank when using water as the heat storing material.

The system in FIG. 3 charges the heat storage tank 24 by a heat pump, discharges the tank 24 by a water pump. This means that the temperature of the water tank 24 must at least 5° C. higher than the room temperature for heating operation, or at least 5° C. lower than the room temperature for cooling operation. Thus, the temperature difference for storing heat/cool is about 10~15° C. If the water tank can be charged or discharged by a heat pump, then the temperature difference can be 45° C.−5° C.=40° C. for both heating and cooling. The invention is just created by using heat pump charging/discharging strategy to implement a heating and cooling system with a compact tank and high efficiency. Also, the invention system also provides water pump working modes to charge or discharge the heat storage tank partially to increase the efficiency further.

In residential house applications, the most efficient heat pump is the ground source heat pump or geothermal heat pump. It uses an extra water loop to exchange heat between ground and the outdoor coil. The heating COP of a geothermal heat pump can be 4 to 5 because the temperature of ground is a constant temperature about 10° C. to 15° C. in all seasons, so the annual electricity bill can be reduced for 30~40% by using a geothermal heat pump for both heating and cooling. However, the initial cost is nearly twice the price of a regular heat pump, furthermore the cost is much higher for drilling ground and installing water pipe. The total cost is around $25,000 in average for installing a geothermal heat pump that means the investment will be gotten back in a longer term such as 10 years or more.

Compared with geothermal heat pump, the invention has a much lower installation cost with significantly improved COP in spring, summer, fall and whole or a part of winter in south regions. Therefore, the invention is suitable in use in warm and hot climate regions, while a geothermal heat pump is a good solution for cold climate regions, where the winter is longer with a high annual heating cost.

SUMMERY OF THE INVENTION

This invention provides a heating and cooling system with compact size and high efficiency. The system is constructed a heat pump and a daily heat storage tank for heating and cooling a house. With the daily heat storage tank, the system works with the way of working shift to catch the highest daily COP and move an amount of heat or cool into the tank for a whole day using, heat or cool stored in the tank is discharged to heat or cool the house in rest time of the day. The system also has water pump working mode for partially charging or discharging the daily storage tank, which increase the system efficiency further. The invention system has five working modes: Compressor Heating or Cooling, Compressor Charging, Compressor Discharging for Heating or Cooling, Water Pump Charging and Water Pump Discharging for Heating or Cooling. In the last two working modes, the heat pump compressor doesn't work, so a water pump works for moving heat or cool between outdoor air and the heat storage tank, or the heat storage tank and indoor air with a lower power consumption.

The invention accomplishes the following features:
- With the heat storage tank, the invention system can work in the best daily COP condition. Compared with an air source heat pump, its COP can be improved more than 40% in average for both heating and cooling.
- The invention system has two working modes with situation the heat pump compressor doesn't work, which is much efficient for charging or discharging the heat storage tank, and heating or cooling a house.
- The installation cost of the invention is much lower than the cost for installing a geothermal heat pump on a residential house.
- With the working mode of time shift by using the daily heat storage tank, the working day and time of the invention system is extended much longer in spring, fall and even winter seasons before the heating system switches to a backup electricity, gas or oil heater.

BRIEF DESCRIPTION OF THE DRAWINGS

FIG. 1, The curve of COP versus the temperature difference between indoor and outdoor coils.

FIG. 2A, Daily outdoor temperature curve and heat pump working status.

FIG. 3, A daily heat storage tank incorporated into a heat pump system.

FIG. 5A, Structure of water-to-water heat pump.

FIG. 6A, The invention system works in mode A, Compressor Heating or Cooling.

FIG. 6C, The invention system works in mode C, Compressor Discharging for Heating or Cooling.

DETAIL DESCRIPTION OF THE INVENTION

Architecture of the Invention System

Figure 2B:
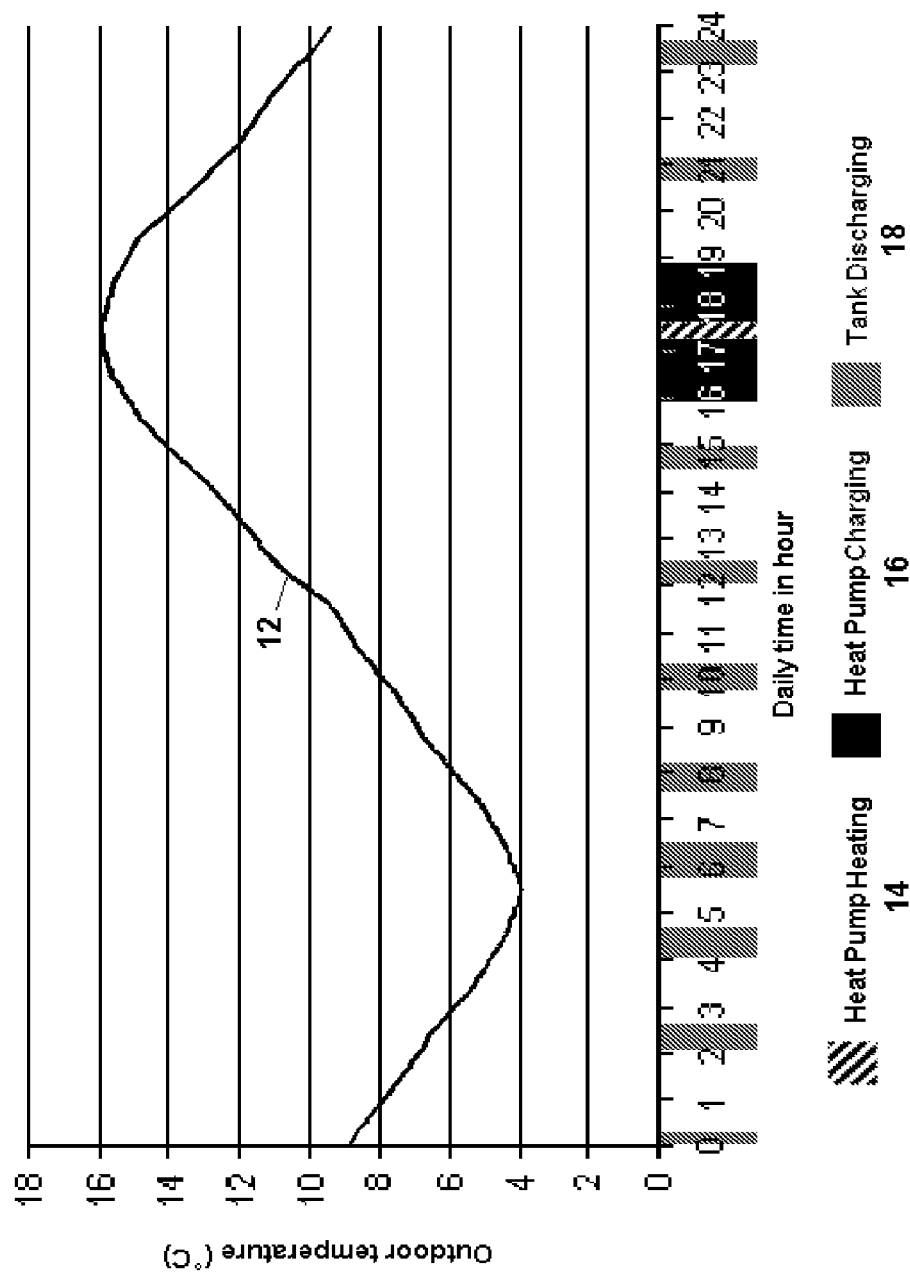
FIG. 2B, Heat pump working in time shift mode with a daily heat storage tank.
Figure 4:
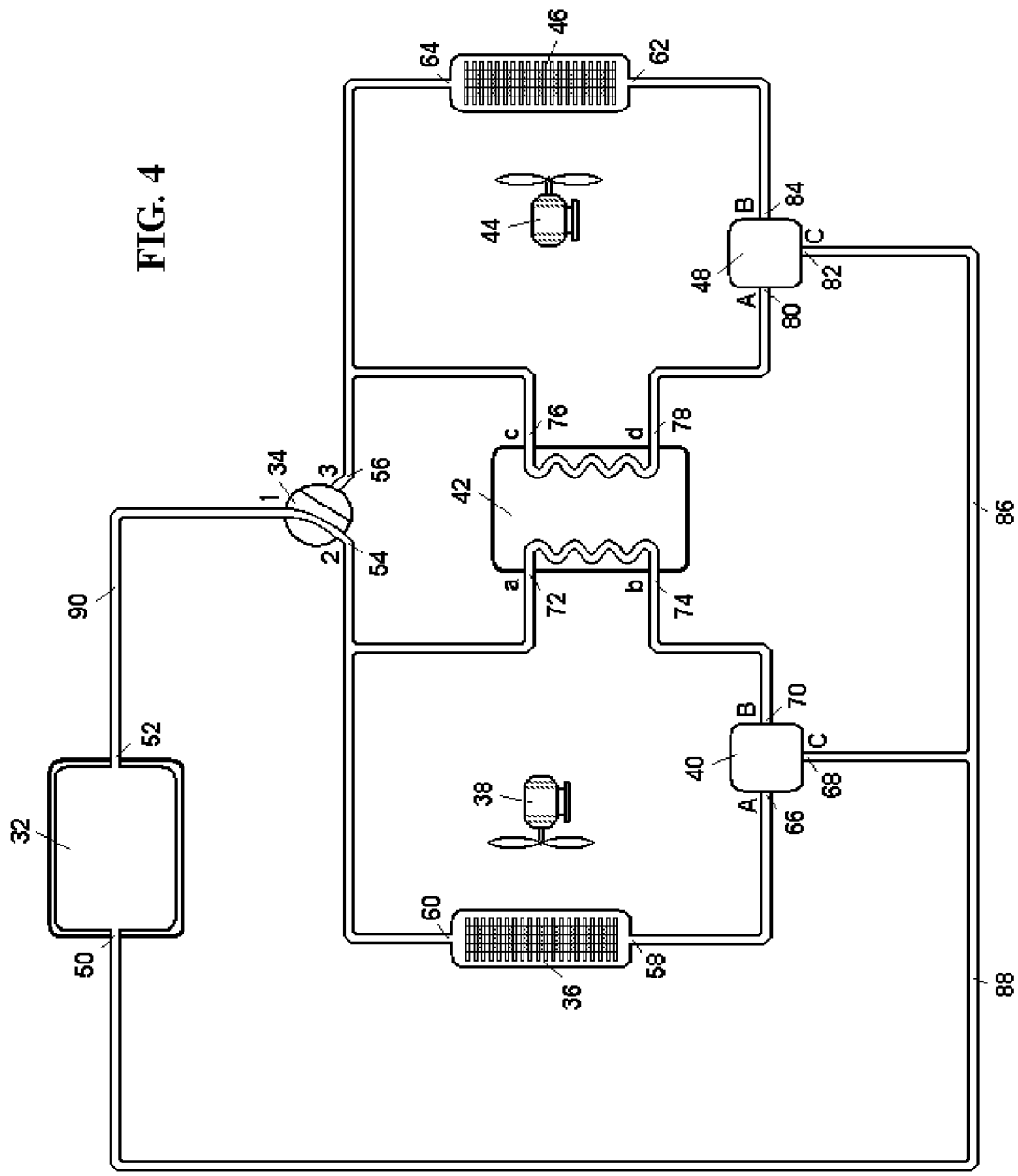
FIG. 4, Structure of the inventive system constructed using a water heat storage tank and heat pump parts.

The invention system is illustrated in FIG. 4. It is constructed by the following parts: a heat storage tank 32, a three-way valve 34, an outdoor coil 36, an outdoor fan 38, an indoor coil 46, an indoor fan 44, a water-to-water heat pump 42, a first three-directional water pump 40, a second three-directional water pump 48 and connecting water tubes.

Parts Functional Description

Heat storage tank 32 uses water as the heat storage material. Since the temperature range for charging or discharging the heat storage tank is from 5° C. to 45° C., the heat storage tank 32 is thermal insolated to keep the temperature of inside water doesn't change for at least 24 hours. The heat storage tank 32 can be charged or discharged by water-to-water heat pump 42 or partially charged or discharged by the first three-directional water pump 40 or the second three-directional water pump 48. Heat is carried into/out of the tank by water flow, which is in different directions in different working modes of the system.

Three-way valve 34 is a fluid control valve whose has three ports: 1, 2 and 3. The fluid path can be set to either 1 to 2 or 1 to 3 by electromagnetic force.

Outdoor coil 36 and Indoor Coil 46 are the same as the outdoor and indoor coils of an air source heat pump. The only difference is that the working material to pass through them for transferring heat is water rather than refrigerant.

Outdoor fan 38 and Indoor Fan 44 are exactly the same as the outdoor fan and indoor fan/blower of an air source heat pump in function.

Water-to-water heat pump 42 is a type of full function heat pump. Unlike an air source heat, both its evaporator and condenser are refrigerant to water heat exchanger, which can be connected to outdoor and indoor water loops respectively. Heat can be delivered either from a(72), b(74) ends of its outdoor side to c(76), d(78) ends of its indoor side, or from c(76), d(78) ends of its indoor side to a(72), b(74) ends of its outdoor side. Water-to-water heat pumps have been many types of commercial products in applications of geothermal heat pumps.

Three-directional water pump 40 or 48 is a created part to implement water flow driving in three directions by using a single water pump and two three-way valves. The first three-directional water pump 40 and the second three-directional water pump 48 are the key parts to fulfill five different connections between the heat storage tank 32 and outdoor coil 36, or one side of water-to-water heat pump 42, or indoor coil 46.

The architecture of three-directional water pump is shown in FIG. 5A. It has three ends: A, B and C, or 122, 124 and 126. Water pump 100 is a single pump to drive the water flow, on which an arrow indicates the direction of water flow. Two three-way valves 102 and 104 are connected to each end of the water pumps respectively. The first three-way valve 102 can be switched onto its 1, 2 path, i.e. the first port 118 of the water pump 100 is connected to the end A or 122 via the first three-way valve 102, or onto its 1, 3 path, i.e. the first port 118 of the water pump 100 is connected to the end C or 126 via the first three-way valve 102. Meanwhile, the second three-way valve 104 can be switched onto its 1, 2 path, i.e. the second port 120 of water pump 100 is connected to the end C or 126 via the second three-way valve 104, or onto its 1, 3 path, i.e. the second port 120 of water pump 100 is connected to the end B or 124 via the second three-way valve 104.

Figure 5B:
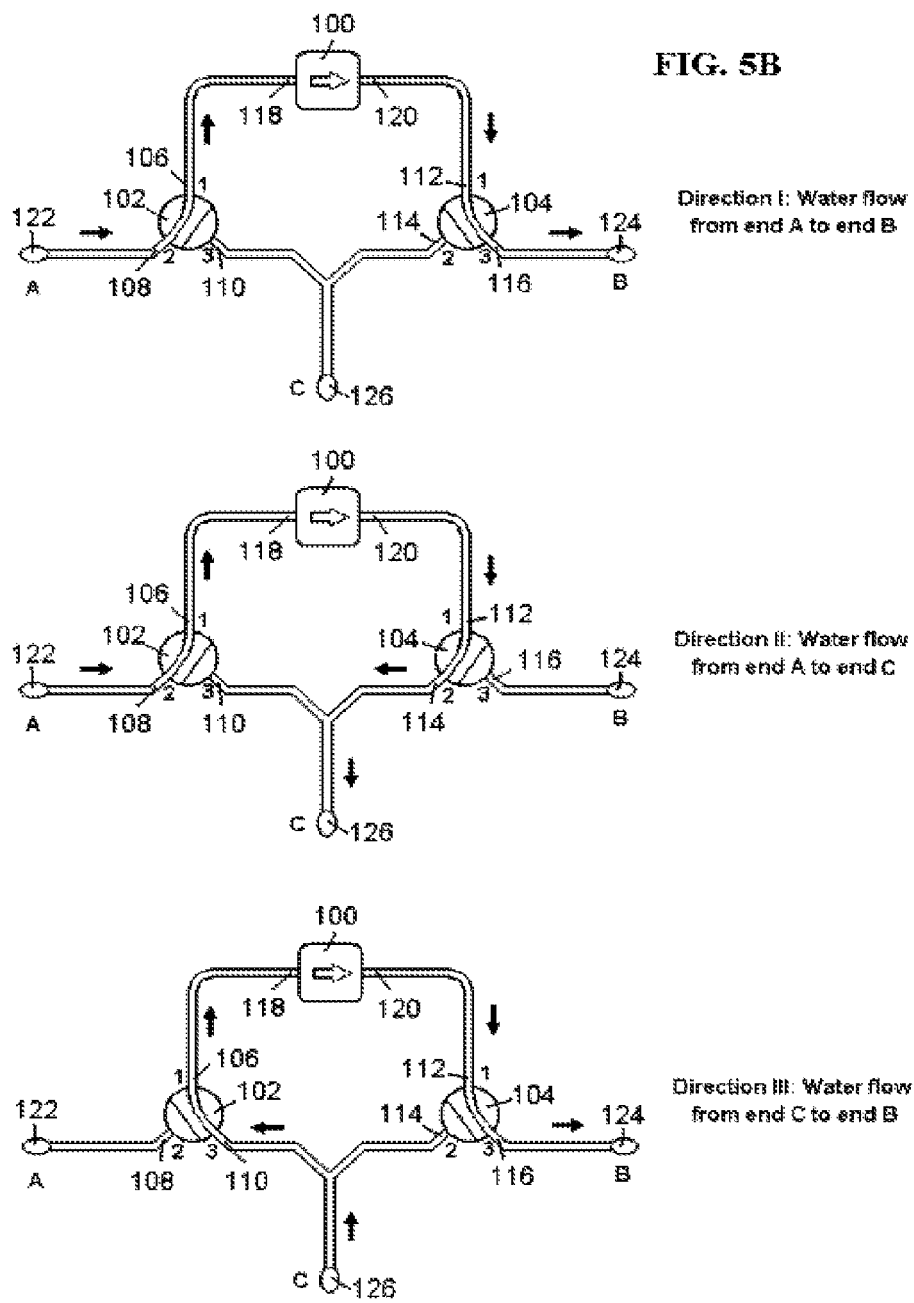
FIG. 5B, Water flow path illustration for three-directional water pump, shade tubes presents water flow path and the arrow on water pump indicates water flow direction.

FIG. 5B illustrates the working principle of three-directional water pump. In FIG. 5B, all of shade tubes express the paths of water flow. There are three drawings as described below:

The top drawing shows that the water pump 100 drives the water flaw to pass the three-directional water pump from its end A to end B, or called Direction I, when the first three-way valve 102 is switched onto its 1, 2 path and the second three-way valve 104 is switched onto its 1, 3 path. The water flow is driven by the water pump 100 along the path of End A, or 122→End 2 of 102→End 1 of 102→End 118 of 100→End 120 of 100→End 1 of 104→End 3 of 104→End B, or 124.

The middle drawing shows that the water pump 100 drives the water flaw to pass the three-directional water pump from its end A to end C, or called Direction II, when both the first and second three-way valves 102 and 104 are switched onto their 1, 2 paths. The water flow is driven by the water pump 100 along the path of End A, or 122→End 2 of 102→End 1 of 102→End 118 of 100→End 120 of 100→End 1 of 104→End 2 of 104→End C, or 126.

The bottom drawing shows that the water pump 100 drives the water flaw to pass the three-directional water pump from its end C to end B, or called Direction III, when both the first and second three-way valves 102 and 104 are switched onto their 1, 3 paths. The water flow is driven by the water pump 100 along End C, or 126→End 3 of 102→End 1 of 102→End 118 of 100→End 120 of 100→End 1 of 104→End 3 of 104→End B, or 124.

System Architecture

The system architecture in FIG. 4 has an outdoor water loop and an indoor water loop, which are on each side of the water-to-water heat pump 42. The outdoor water loop is shown as End 58 of outdoor coil 36→End 66 of the first three-directional water pump 40→End 70 of the first three-directional water pump 40→End 74 of water-to-water heat pump 42→End 72 of water-to-water heat pump 42→End 60 of outdoor coil 36. While the indoor water loop is shown as End 62 of indoor coil 46→End 84 of the second three-directional water pump 48→End 80 of the second three-directional water pump 48→End 78 of water-to-water heat pump 42→End 76 of water-to-water heat pump 42→End 64 of indoor coil 46. The heat storage tank 32 can be connected to either the outdoor water loop via the first three-directional water pump 40 or the indoor water loop via the second three-directional water pump 48. Thus, the heat storage tank 32 can work not only with outdoor coil 36 or the outdoor side (a, b ends) of the water-to-water heat pump 42 together, but also with indoor coil 46 or the indoor side (c, d ends) of the water-to-water heat pump 42 together.

Working Modes of Invention System

Based on the architecture of system topology in FIG. 4, the system has five working modes: Compressor Heating or Cooling, Compressor Charging, Compressor Discharging for Heating or Cooling, Water Pump Charging and Water Pump Discharging for Heating or Cooling. FIG. 6A~6E illustrate the active water loops of these working modes, which are shown as shade tubes and described as below.

Working Mode A, Compressor Heating or Cooling

Compressor heating or Cooling mode is shown in FIG. 6A. The first and second three-directional water pumps 40 and 48 are all set to Direction I, or both water flows in outdoor and indoor water loops pass from their A end to B end. The water pump 40 drives the water loop of outdoor coil 36 and a, b ends on the outdoor side of water-to-water heat pump 42, while the water pump 48 drives the other water loop of indoor coil 46 and c, d ends on the indoor side of water-to-water heat pump 42. Fans 38 and 44, Water-to-water heat pump 42 are all running. The system works the same as a normal air to air heat pump in function. The heat storage tank is not active. In working mode A, the system has the lowest efficiency due to all of the two water pumps, heat pump and fans are working. The system remains working mode A just for compatibility with a normal heat pump, there is a rear rate for the invention system to run the working mode A.

Working Mode B, Compressor Charging

Figure 6B:
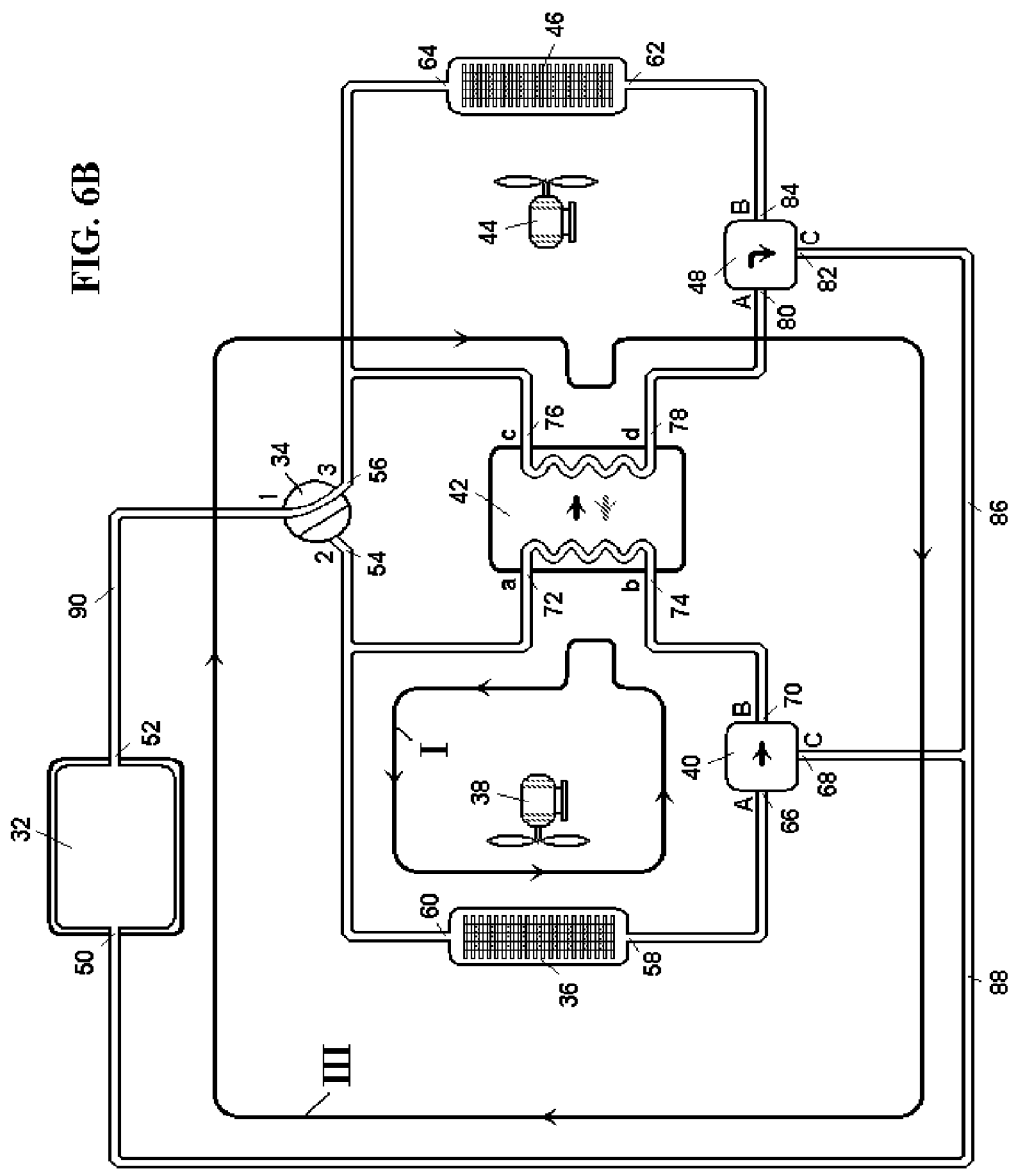
FIG. 6B, The invention system works in mode B, Compressor Charging.

Compressor Charging mode is shown in FIG. 6B. The first three-directional water pumps 40 is set to Direction I, or water flows from its A end to B end, the second three-directional water pumps 48 is set to Direction II, or water flows from its A end to C end, and the three-way valve 34 is switched to its 1 to 3 path. The outdoor coil 36 is connected to a, b end on the outdoor side of water-to-water heat pump 42, the same as their connection in working mode A, and the outdoor fan 38 is on. The indoor coil 46 is not active, and the indoor fan/blower is off neither. The second three-directional water pump 48 drives the water loop between the heat storage tank 32 and c, d end on the indoor side of water-to-water heat pump 42, which charges the heat/cool taken from the outdoor air through the outdoor coil 36 into the heat storage tank 32.

Working Mode C, Compressor Discharging for Heating or Cooling

Compressor Discharging for Heating or Cooling mode is shown in FIG. 6C. The first three-directional water pumps 40 is set to Direction III, or water flows from its C end to B end. The second three-directional water pumps 48 is set to Direction I, or water flows from its A end to B end, and the three-way valve 34 is switched to its 1 to 2 path. The indoor coil 46 is connected to c, d end on the indoor side of Water-to-water to water heat pump 42, the same as their connection in working mode A, and the indoor fan 44 is on. The outdoor coil 36 is not active and the outdoor fan 38 is off. The first three-directional water pump 40 drives the water loop between the heat storage tank 32 and a, b end on the outdoor side of water-to-water heat pump 42, which discharges the heat/cool from the heat storage tank 32 through the indoor coil 46 into the indoor air blew by the indoor fan/blower 44 to heat/cool the house.

Working Mode D, Water Pump Charging

Figure 6D:
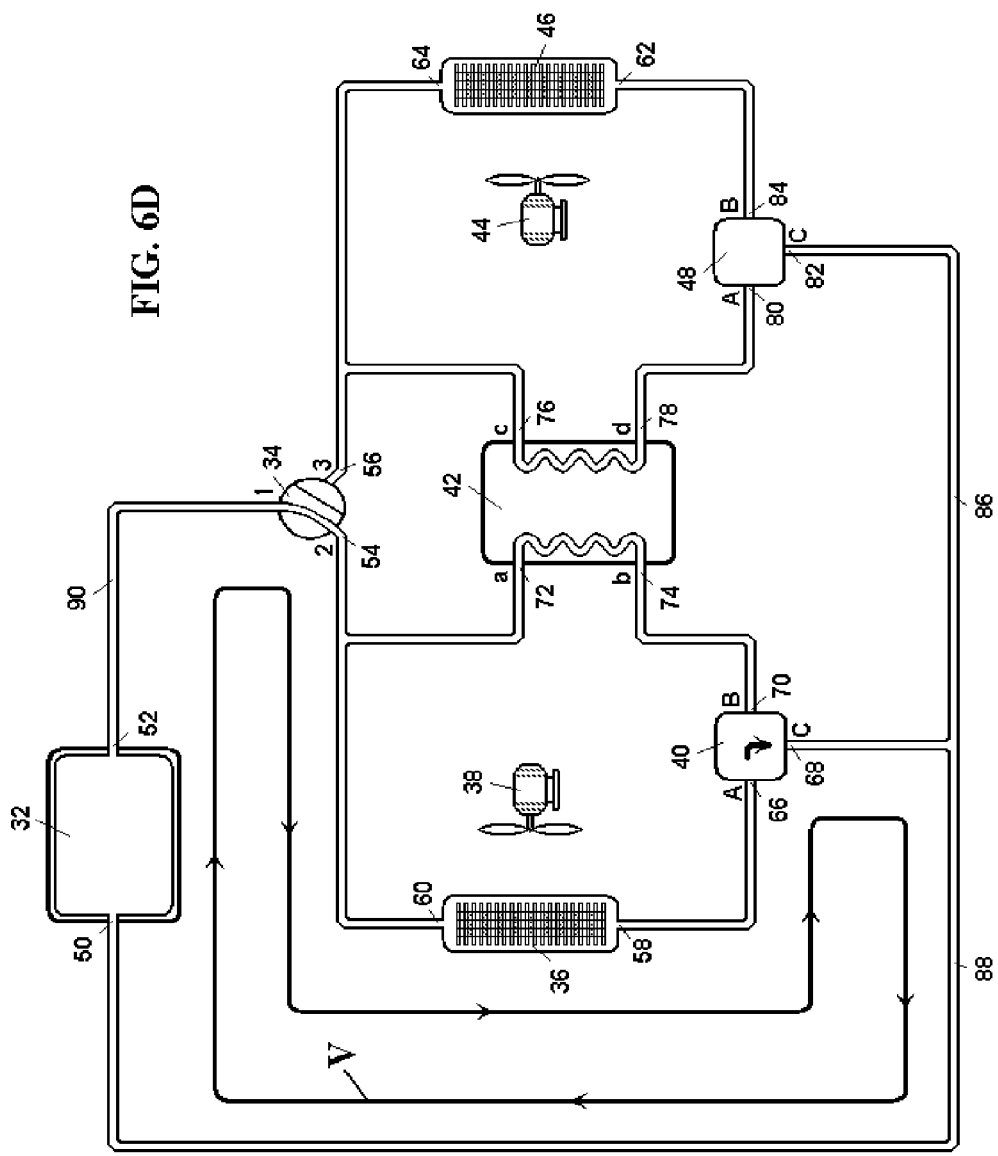
FIG. 6D, The invention system works in mode D, Water Pump Charging.

Water Pump Charging mode is shown in FIG. 6D. The first three-directional water pumps 40 is set to Direction 11, or water flows from its A end to C end. The second three-directional water pumps 48 is not active, and the three-way valve 34 is switched to its 1 to 2 path. The outdoor coil 36 is connected to the heat storage tank 32 to form a water loop and the outdoor fan 38 is on. Only the first three-directional water pump 40 drives the water loop. The water-to-water heat pump 42, indoor coil 46 and indoor fan 44 are not active. In case of temperature difference between outdoor air and the heat storage tank 32 is larger than 5° C., and if the outdoor temperature is higher, the system works as Water Pump Charging Mode, or working mode D to charge heat from outdoor air through the outdoor coil 36 into the heat storage tank 32. If the outdoor temperature is lower than the temperature of heat storage tank for 5° C. or larger, the system works as working mode D to charge cool from outdoor air through the outdoor coil 36 into the heat storage tank 32.

Working Mode E, Water Pump Discharging for Heating or Cooling

Figure 6E:
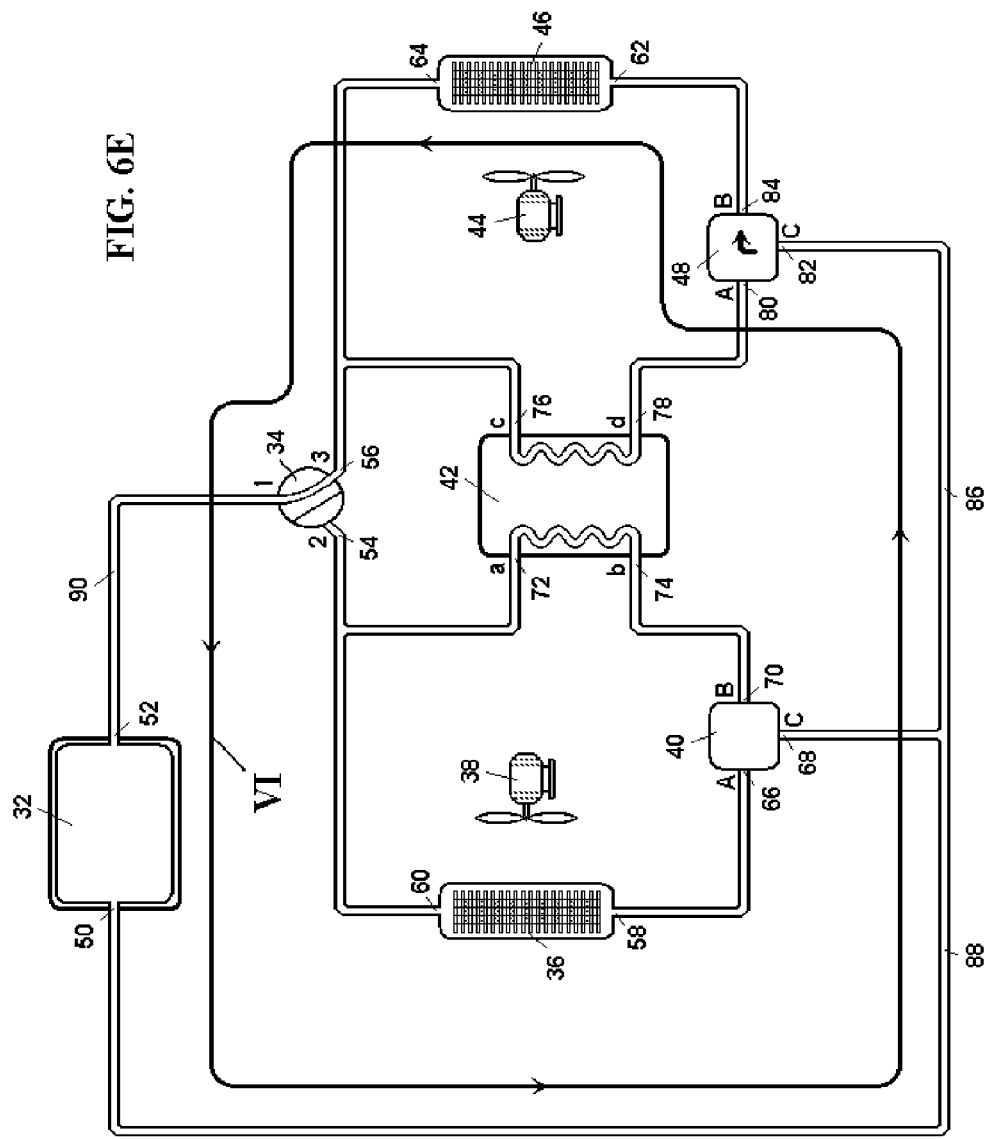
FIG. 6E, The invention system works in mode E, Water Pump Discharging for Heating or Cooling.

Water Pump Discharging mode is shown in FIG. 6E. The first three-directional water pumps 40 is not active, the second three-directional water pumps 48 is set to Direction III, or water flows from its C end to B end, and three-way valve 34 is switched to its 1 to 3 path. The indoor coil 46 is connected to the heat storage tank 32 to form a water loop, and the indoor fan 44 is on. The water loop is driven by the second three-directional water pump 48. the water-to-water heat pump 42, outdoor coil 36 and outdoor fan 38 are not active. In case of temperature difference between indoor air and the heat storage tank 32 is larger than 5° C., and the temperature of the heat storage tank 32 is higher in heating operation or lower in cooling operation, then the system can work as working mode F to discharge heat or cool from the heat storage tank 32 through the indoor coil 46 into the indoor air for heating or cooling the house.

Water Pump Charging and Discharging

Working with a water heat storage tank, the invention system runs in working shift mode in most of time, which means the system charges the heat storage tank in a certain time every day and discharge the tank for heating or cooling a house in other time of the day. If the system only worked in compressor charging and discharging, it would take more energy than a regular heat pump because the compressor works in both tank charging and discharging, i.e. two times working, while the compressor of a regular heat pump works one time when it is working. Therefore, Water Pump Charging and Discharging modes are introduced in the invention system to save the energy further. In most cases, Water Pump Charging and Discharging only move partial heat into or out of the tank. For example, if the room temperature is 22° C., Water Pump Discharging mode is active in heating operation if the water temperature inside the heat storage tank is above 28° C., i.e. 28~45° C.; or in cooling operation if the water temperature inside the heat storage tank is below 16° C., i.e. 5~16° C., Water Pump Discharging mode is also active to cool the house. If more heat/cool needs to be charged or discharged, Compressor Charging and Discharging modes will take over Water Pump Charging and Discharging mode. When the system working Compressor Charging and Discharging modes, the temperature of water inside tank can reach the upper rail 45° C. in heat charging or cool discharging operations, and bottom rail 5° C. in cool charging or heat discharging operations.

Smarter Thermostat

Traditional thermostats only control a heat pump to heat/cool the room temperature in a certain range around one setting point of indoor temperature. Digital thermostats add a time factor, so the setting temperature can be different values in different daily or weekly time. Compared with traditional thermostats, digital thermostats have advantages of setting different temperatures in day time and night time, and setting a low working mode when no person is at home. Only some digital thermostats have an outdoor sensor, which can provide an outdoor temperature point for the thermostat to switch the system between the heat pump heating and gas/electricity heating. However, the thermostat, which is called "Smarter thermostat", for controlling the invention system is much more complicate than any current thermostat.

Based on the best digital thermostat, Smarter Thermostat has many further capabilities: selecting the best time to charge the daily heat storage tank, discharging the tank for H/C, measuring and managing daily amount of exchanged heat, and selecting the best working mode for charging and discharging the tank. They are described as below in detail.

1. Selecting the Best Time to Charge the Daily Heat Storage Tank

Usually, the highest temperature time happens in 2:00 pm~7:00 pm for charging heat to the daily heat storage tank, and the lowest temperature time happens in 3:00 am~8:00 am for charging cool to the tank. However, the peak point and curve of daily temperature is always various in different climate areas, different seasons or even two adjacent days. Therefore, a statistic method may not catch the daily temperature peak in optimization. Although the top of peak can be caught by using an outdoor temperature sensor, when a peak is detected, half of the best working time may be missed in case the peak is sharp.

The smarter thermostat gives an effective method by using weather forecast combined with an outdoor confirming temperature sensor to catch the best daily temperature peak. Currently, radio weather forecast covers most part of US, Canada and some other countries. Also, internet weather forecast devices become more and more popular. Some radio and internet products have been available in the market to receive and display weather and weather forecast information.

There are two methods to catch the daily temperature peak.

One is to detect the outdoor temperature by using the outdoor temperature sensor and compare it with the highest or lowest daily temperature. In heating season, when the outdoor temperature is 1° C. lower than the highest daily temperature of forecast, the invention system is turned on in heating operation for two or three hours to charge heat into the heat storage tank to full. In cooling season, when the outdoor temperature is 1° C. higher than the lowest daily temperature of forecast, the invention system is turned on in cooling operation for two or three hours to charge cool into the heat storage tank. In most cases, this method can catch the peak, but sometime the daily temperature peak remains the same temperature for three or four hours, the caught peak is not fall in the best duration. Also, the outdoor temperature sensor has an error in measurement, and the temperature at the house location has a difference to the forecast value, these factors may impact the action of peak catching.

The other method is to get the daily temperature forecast curve in hourly scale, and then decide the duration to turn on the invention system. In this case, the outdoor temperature sensor works as a reference to monitor and confirm the outdoor temperature. Daily temperature forecast curve has not been available at many of current weather forecast radio stations or internet websites. This information can be received by the Smarter Thermostat for catching the daily temperature peak.

2. Measuring and Managing the Tank, and Discharging for Heating or Cooling

Unlike the control of a normal heat pump, the invention system heats or cools the house by using the working mode of Tank Discharging for Heating or Cooling in most of time. Since the invention is designed as an energy saving product, the smarter thermostat must have the capability to measure and manage the daily storage tank. For example, the smarter thermostat knows and memorizes how much heat or cool is stored inside the tank. Otherwise, an over charging or discharge would happen to waste the electric energy.

In the water tank, only one temperature sensor installed at the end of water flow can measure the amount of stored heat in the tank. The temperature of water inside the tank versus the "level" of heat is a linear curve and the total amount of heat is decided by the total amount of water inside the tank, so it is easy to measure the storage heat by measuring the temperature.

After each discharging, the smarter thermostat measures the amount of heat for daily use and decides how much heat the tank needs for the next charging. This can be one of the conditions to determine the work mode.

3. Selecting the Best Working Mode for Charging and Discharging the Tank

In the invention system, the heat storage tank can be charged by using either Water Pump Charging, working mode D or Compressor Charging, working mode B, and discharged by using either Water Pump Discharging, working mode E or Compressor Discharging, working mode C. Water pump charging or discharging has the advantages of lower power consumption and low sound noise, but it only exchanges a part of heat in the tank with outdoor or indoor air. While compressor charging or discharging has the advantages to exchange much more heat between the same size water tank and outdoor or indoor air, but the compressor works aloud and runs at a higher power level than that of water pump.

Since the daily temperature curve is various in different climate areas and different seasons, the daily amount of heat for heating or cooling is always different and less than the maximum amount of stored heat in the tank. The smarter thermostat adjusts the heat level in tank as the best condition for charging and discharging by using a water pump or compressor.

In heating operation, the smarter thermostat controls the system charging the tank to full, or the highest temperature such as 45° C., and then discharging for heating the house starts by using Water Pump Discharging, mode E, first from 45° C. to 30° C., further discharging is taken over by Compressor Discharging, mode C, from 30° C. to 5° C. In most of time, the heat discharging is not complete such as the discharging only reaches 10° C. If the highest outdoor temperature is 20° C. in the next day, the heat charging will start by using Water Pump Charging, mode D from 10° C. to 15° C., and then switch to Compressor Charging, mode B to heat full from 15° C. to 45° C.

In cooling operation, the smarter thermostat controls the system charging cool into the tank to full, or the lowest temperature 5° C., then discharging for cooling the house starts by using Water Pump Discharging, mode E first from 5° C. to 15° C., and further discharging is taken over by Compressor Discharging, mode C from 15° C. to 45° C. Also, in most of time, the cool discharging is not complete such as discharging only reaches 30° C. If the lowest outdoor temperature is 15° C. in the next day, the heat charging will start by using Water Pump Charging, mode D from 30° C. to 20° C., and then switch to Compressor Charging, mode B to cool full from 20° C. to 5° C.

In some cases, the invention system can work in fully water pump charging and discharging modes. For example, when the daily temperature changes from 15° C.~25° C., the system works for slight heating in the midnight and morning, or the daily temperature changes from 20° C.~30° C., the system works for slight cooling in the afternoon and evening. Therefore, the smarter thermostat is the key part to keep the system running in a high efficiency.

System Architecture

Exemplary Embodiment

The heating and cooling system of the current invention includes a heat storage tank 32 for storing and releasing heat energy based on daily outdoor temperature variances. The system includes, referring to FIG. 4, a heat storage tank 32, an outdoor coil 36, an indoor coil 46, a water-to-water heat pump 42, an outdoor fan 38, an indoor fan 44, a three-way valve 34, a first three-directional water pump 40, and a second three-directional water pump 48.

The heat storage tank 32 connects to the three-way valve 34 by a connecting tube 90. The heat storage tank 32 connects to the first three-directional water pump 40 by a connecting tube 88. The heat storage tank 32 connects to the second three-directional water pump 48 by a connecting tube 86 via the connecting tube 88.

A first port 50 of the heat storage tank 32 connects to the outdoor coil 36 via the first three-directional water pump 40. A second port 52 of the heat storage tank 32 connects to the outdoor coil 36 via the three-way valve 34. The first port 50 of the heat storage tank 32 connects to an outdoor side of the water-to-water heat pump 42 via the first three-directional water pump 40. The second port 52 of the heat storage tank 32 connects to the outdoor side of the water-to-water heat pump 42 via the three-way valve 34.

The first port 50 of the heat storage tank 32 connects to the second three-directional water pump 48 by a connecting tube 86 and the connecting tube 88. The first port 50 of the heat storage tank 32 connects to the indoor coil 46 via the second three-directional water pump 48. The first port 50 of the heat storage tank 32 connects to an indoor side of the water-to-water heat pump 42 via the second three-directional water pump 48. The second port 52 of the heat storage tank 32 connects to the indoor coil 46 via the three-way valve 34. The second port 52 of the heat storage tank 32 connects to the indoor side of the water-to-water heat pump 42 via the three-way valve 34.

The outdoor coil 36, the first three-directional water pump 40, and the outdoor side of water-to-water heat pump 42 are connected to form a loop. The indoor coil 46, the second three-directional water pump 48, and the indoor side of water-to-water heat pump 42 are connected to form a loop.

A first port 66 of the first three-directional water pump 40 connects to a first port 58 of the outdoor coil 36. A second port 70 of the first three-directional water pump 40 connects to a second port 74 on the outdoor side of the water-to-water heat pump 42. A third port 68 of first three-directional water pump 40 connects to the first port 50 of the heat storage tank 32.

A first port 80 of the second three-directional water pump 48 connects to a fourth end 78 on the indoor side of the water-to-water heat pump 42. A second port 84 of the second three-directional water pump 48 connects to a first port 62 of the indoor coil 46. A third port 82 of the second three-directional water pump 48 connects to the first port 50 of the heat storage tank 32. The third port 82 of the second three-directional water pump 48 connects to the third port 68 of the first three-directional water pump 40.

A second port 60 of the outdoor coil 36 connects to a first port 72 on the outdoor side of the water-to-water heat pump 42. The second port 60 of the outdoor coil 36 connects to a second port 54 of the three-way valve 34.

A second port 64 of the indoor coil 46 connects to a third port 56 of the three-way valve 34. The second port 64 of the indoor coil 46 connects to a third port 76 on the indoor side of the water-to-water heat pump 42.

The second port 54 of the three-way valve 34 connects to the first port 72 on the outdoor side of the water-to-water heat pump 42. The third port 56 of the three-way valve 34 connects to the third port 76 on the indoor side of the water-to-water heat pump 42.

The outdoor fan 38 is positioned close to the outdoor coil 36, the outdoor fan blows air through the outdoor coil 36 when it is working. The indoor fan 44 is positioned close to the indoor coil 46, the indoor fan blows air through the indoor coil 46 when it is working.

The invention claimed is:

1. A heating and cooling system comprising:
a heat storage tank;
an outdoor coil;
an indoor coil;
a water-to-water heat pump;
an outdoor fan;
an indoor fan;
a three-way valve;
a first three-directional water pump wherein the three directional water pump comprises a first water pump, a second three-way valve, and a third three-way valve;
a second three-directional water pump wherein the second three directional water pump comprises a second water pump, a fourth three-way valve, and a fifth three-way valve;
the heat storage tank connecting to the three-way valve by a connecting tube;
the heat storage tank connecting to the first three-directional water pump by a connecting tube;
the heat storage tank connecting to the second three-directional water pump by a connecting tube;
a first port of the heat storage tank connecting to the outdoor coil via the first three-directional water pump;
a second port of the heat storage tank connecting to the outdoor coil via the three-way valve;
the first port of the heat storage tank connecting to the outdoor side of water-to-water heat pump via the first three-directional water pump;
the second port of the heat storage tank connecting to the outdoor side of water-to-water heat pump via the three-way valve;
the first port of the heat storage tank connecting to the second three-directional water pump by a connecting tube;
the first port of the heat storage tank connecting to the indoor coil via the second three-directional water pump;
the first port of the heat storage tank connecting to an indoor side of the water-to-water heat pump via the second three directional water pump;
the second port of the heat storage tank connecting to the indoor coil via the three-way valve;
the second port of the heat storage tank connecting to the indoor side of the water-to-water heat pump via the three-way valve;
the outdoor coil, the first three-directional water pump, and the outdoor side of the water-to-water heat pump being connected to form a loop; and
the indoor coil, the second three-directional water pump, and the indoor side of the water-to-water heat pump being connected to form a loop.

2. The heating and cooling system of claim 1 comprising:
a first port of the first three directional water pump connecting to a first port of the outdoor coil;
a second port of the first three directional water pump connecting to a second port of the water-to-water heat pump;
a third port of the first three directional water pump connecting to the first port of the heat storage tank;
a first port of the second three directional water pump connecting to a fourth port of the water-to-water heat pump;
a second port of the second three directional water pump connecting to a first port of the indoor coil;
a third port of the second three directional water pump connecting to the first port of the heat storage tank; and the third port of the second three directional water pump connecting to the third port of the first three directional water pump.

3. The heating and cooling system of claim 1 comprising:
a second port of the outdoor coil connecting to a first port of the water-to-water heat pump;
the second port of the outdoor coil connecting to a second port of the three-way valve;
a second port of the indoor coil connecting to a third port of the three-way valve;
the second port of the indoor coil connecting to a third of the water-to-water heat pump;
the second port of the three-way valve connecting to the first port of the water-to-water heat pump; and
the third port of the three-way valve connecting to the third port of the water-to-water heat pump;
the outdoor fan being controlled to work with the outdoor coil simultaneously, and a working outdoor fan blowing air through the outdoor coil; and
the indoor fan being controlled to work with the indoor coil simultaneously, and a working indoor fan blows air through the indoor coil.

4. A heating and cooling system comprising:
a heat storage tank;
an outdoor coil;
a three-way valve;
a first three directional water pump wherein the first three directional water pump comprises a first water pump, a second three-way valve, and a third three-way valve;
a second three directional water pump wherein the second three-directional water pump comprises a second water pump, a fourth three-way valve, and a fifth three-way valve;
the heat storage tank connecting to the three-way valve by a connecting tube;
the heat storage tank connecting to the first three directional water pump by a connecting tube;
the heat storage tank connecting to the second three directional water pump by a connecting tube;
a first port of the heat storage tank connecting to the outdoor coil via the first three directional water pump;
a second port of the heat storage tank connecting to the outdoor coil via the three-way valve;
an indoor coil;
a water-to-water heat pump;
an outdoor fan;
an indoor fan;
the first port of the heat storage tank connecting to the second three-directional water pump by a connecting tube;
the first port of the heat storage tank connecting to the indoor coil via the second three-directional water pump;
the second port of the heat storage tank connecting to the indoor coil via the three-way valve;
the outdoor fan being controlled to work with the outdoor coil simultaneously, and a working outdoor fan blowing air through the outdoor coil;
the indoor fan being controlled to work with the indoor coil simultaneously, and a working indoor fan blows air through the indoor coil;
the first port of the heat storage tank connecting to an outdoor side of the water-to-water heat pump via the first three-directional water pump;
the second port of the heat storage tank connecting to an outdoor side of the water-to-water heat pump via the three-way valve;
the outdoor coil, the first three-directional water pump, and the outdoor side of the water-to-water heat pump being connected to form a loop; and
the indoor coil, the second three-directional water pump, and an indoor side of the water-to-water heat pump being connected to form a loop.

5. The heating and cooling system of claim 4 comprising:
a first port of the first three directional water pump connecting to a first port of the outdoor coil;
a second port of the first three directional water pump connecting to a second port of the water-to-water heat pump;
a third port of the first three directional water pump connecting to the first port of the heat storage tank;
a first port of the second three directional water pump connecting to a fourth port of the water-to-water heat pump;
a second port of the second three directional water pump connecting to a first port of the indoor coil;
a third port of the second three directional water pump connecting to the first port of the heat storage tank; and
the third port of the second three directional water pump connecting to the third port of the first three directional water pump.

6. The heating and cooling system of claim 4 comprising:
a second port of the outdoor coil connecting to a first port of the water-to-water heat pump;
the second port of the outdoor coil connecting to a second port of the three-way valve;
the second port of the outdoor coil connecting to a first port of the water-to-water heat pump;
a second port of the indoor coil connecting to a third port of the three-way valve;
the second port of the indoor coil connecting to a third port of the water-to-water heat pump;
the second port of the three-way valve connecting to the first port of the water-to-water heat pump; and
the third port of the three-way valve connecting to the third port of the water-to-water heat pump.

7. A heating and cooling system comprising:
a heat storage tank;
an outdoor coil;
an indoor coil;
a water to-water-water heat pump;
an outdoor fan;
an indoor fan;
a three-way valve;
a first three directional water pump wherein the first three directional water pump comprises a first water pump, a second three-way valve, and a third three-way valve;
a second three directional water pump wherein the second three directional water pump comprises a second water pump, a fourth three-way valve, and a fifth three-way valve;
a first port of the first three directional water pump connecting to a first port of the outdoor coil;
a second port of the first three directional water pump connecting to a second port of the water-to-water heat pump;
a third port of the first three directional water pump connecting to a first port of the heat storage tank;
a first port of the second three directional water pump connecting to a fourth port of the water-to-water heat pump;
a second port of the second three directional water pump connecting to a first port of the indoor coil;

a third port of the second three directional water pump connecting to the first port of the heat storage tank;
the third port of the second three direction directional water pump connecting to the third port of the first three directional water pump;
the outdoor fan being controlled to work with the outdoor coil simultaneously, and a working outdoor fan blowing air through the outdoor coil;
the indoor fan being controlled to work with the indoor coil simultaneously, and a working indoor fan blows air through the indoor coil;
the heat storage tank connecting to the three-way valve by a connecting tube;
the heat storage tank connecting to the first three-directional water pump by a connecting tube;
the heat storage tank connecting to the second three-directional water pump by a connecting tube;
a first port of the heat storage tank connecting to the outdoor coil via the first three-directional water pump;
a second port of the heat storage tank connecting to the outdoor coil via the three-way valve;
the first port of the heat storage tank connecting to the water-to-water heat pump via the first three-directional water pump; and
the second port of the heat storage tank connecting to the water-to-water heat pump via the three-way valve;
the first port of the heat storage tank connecting to the second three-directional water pump by a connecting tube;
the first port of the heat storage tank connecting to the indoor coil via the second three-directional water pump; and
the second port of the heat storage tank connecting to the indoor coil via the three-way valve;
the outdoor coil, the first three-directional water pump, and an outdoor side of the water-to-water heat pump being connected to form a loop; and
the indoor coil, the second three-directional water pump, and an indoor side of the water-to-water heat pump being connected to form a loop.

8. The heating and cooling system of claim 7 comprising:
a second port of the outdoor coil connecting to a first port of the water-to-water heat pump;
the second port of the outdoor coil connecting to a second port of the three-way valve;
the second port of the outdoor coil connecting to a first port of the water-to-water heat pump;
a second port of the indoor coil connecting to a third port of the three-way valve;
the second port of the indoor coil connecting to a third port of the water-to-water heat pump;
the second port of the three-way valve connecting to the first port of the water-to-water heat pump; and
the third port of the three-way valve connecting to the third port of the water-to-water heat pump.

* * * * *